United States Patent
Ma et al.

(10) Patent No.: US 11,012,192 B2
(45) Date of Patent: May 18, 2021

(54) CONTROL INFORMATION SENDING METHOD AND APPARATUS, AND CONTROL INFORMATION RECEIVING METHOD AND APPARATUS

(71) Applicant: Huawei Technologies Co., Ltd., Shenzhen (CN)

(72) Inventors: Ruixiang Ma, Beijing (CN); Yongxia Lyu, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/456,859

(22) Filed: Jun. 28, 2019

(65) Prior Publication Data

US 2019/0334656 A1 Oct. 31, 2019

Related U.S. Application Data

(63) Continuation of application No. PCT/CN2017/115376, filed on Dec. 11, 2017.

(30) Foreign Application Priority Data

Dec. 30, 2016 (CN) .......................... 201611264483.1

(51) Int. Cl.
*H04L 1/06* (2006.01)
*H04L 1/00* (2006.01)
(Continued)

(52) U.S. Cl.
CPC .......... *H04L 1/0643* (2013.01); *H04L 1/0004* (2013.01); *H04L 1/0675* (2013.01); *H04L 1/1614* (2013.01); *H04W 80/08* (2013.01)

(58) Field of Classification Search
CPC ..................................................... H04L 1/0643
See application file for complete search history.

(56) References Cited

U.S. PATENT DOCUMENTS

| 8,234,551 B2 | 7/2012 | Shen et al. |
| 10,582,531 B2 * | 3/2020 | Hwang ............. H04W 72/0446 |

(Continued)

FOREIGN PATENT DOCUMENTS

| CN | 101615986 A | 12/2009 |
| CN | 101699780 A | 4/2010 |

(Continued)

*Primary Examiner* — John D Blanton
(74) *Attorney, Agent, or Firm* — Slater Matsil, LLP (57) ABSTRACT

Embodiments of this application provide a control information sending method and apparatus. A network device generates first control information for a first TB, where the first TB includes n code block (CB) groups, where N is a maximum quantity of CB groups included in the first TB; each CB group includes at least one CB; the first control information includes N control information fields, and the N control information fields are in correspondence with the maximum N CB groups included in the first TB; and a control information field i in the N control information fields is used to indicate whether a CB group corresponding to the control information field i is to be sent or received, and $i \in [1, N]$. In this way, a quantity of bits included in downlink control information can remain fixed, thereby reducing blind detection complexity of a terminal device.

17 Claims, 5 Drawing Sheets

(51) Int. Cl.
*H04L 1/16* (2006.01)
*H04W 80/08* (2009.01)

(56) References Cited

U.S. PATENT DOCUMENTS

| | | | |
|---|---|---|---|
| 2016/0226643 A1* | 8/2016 | Mallik | H04L 1/0089 |
| 2017/0303284 A1 | 10/2017 | Xu et al. | |
| 2018/0242317 A1* | 8/2018 | Marinier | H04W 56/001 |
| 2019/0181986 A1* | 6/2019 | Kitamura | H04L 1/1819 |

FOREIGN PATENT DOCUMENTS

| | | |
|---|---|---|
| CN | 105281868 A | 1/2016 |
| CN | 2018082661 A1 | 5/2018 |
| EP | 3474475 A1 | 4/2019 |
| EP | 3537644 A1 | 9/2019 |
| JP | 2016121998 A | 7/2016 |
| JP | 2018507636 A | 3/2018 |
| WO | 2010109521 A1 | 9/2010 |
| WO | 20105515733 A | 4/2016 |
| WO | 2016126330 A1 | 8/2016 |
| WO | 2017221871 A1 | 12/2017 |

* cited by examiner

CONTROL INFORMATION SENDING METHOD AND APPARATUS, AND CONTROL INFORMATION RECEIVING METHOD AND APPARATUS

CROSS-REFERENCE TO RELATED APPLICATIONS

This application is a continuation of International Application No. PCT/CN2017/115376, filed on Dec. 11, 2017, which claims priority to Chinese Patent Application No. 201611264483.1, filed on Dec. 30, 2016. The disclosures of the aforementioned applications are hereby incorporated herein by reference in their entireties.

TECHNICAL FIELD

Embodiments of this application relate to the communications field, and more specifically, to a control information sending method and an apparatus, and a control information receiving method and an apparatus.

BACKGROUND

With development of communications technologies, a peak data rate keeps increasing, and a size (for example, a quantity of included bits) of a transport block (TB) increases accordingly.

In order to improve communication accuracy and reliability, a feedback mechanism is proposed. To be specific, a receive end generates, based on a decoding structure of a received TB, feedback information specific to the TB, for example, acknowledgment (ACK) information or negative acknowledgment (NACK) information.

However, once an error occurs on such a TB-based feedback mechanism, retransmission of the entire TB is caused, and resources are undoubtedly wasted as a result.

In view of this, a TB may be divided into a plurality of code blocks (CBs), and feedback is performed based on the CBs. That is, feedback information is specific to the CBs, thereby avoiding retransmission of the entire TB due to a transmission error of some data.

However, in such a CB-based feedback mechanism, for example, if the TB is very large, feedback information specific to a plurality of CBs is to be transmitted in one feedback process, resulting in relatively large resource overheads of the feedback information.

To resolve this problem, CBs may be grouped into a plurality of CB groups, and feedback is performed based on the CB group. That is, feedback information is specific to the CB group.

However, in order to implement a CB group-based feedback mechanism, control information, for example, downlink control information (DCI), needs to include control information of each CB group. Because sizes of TBs vary, quantities of CB groups included in the TBs may be different. As a result, a quantity of bits in the DCI may dynamically change, increasing blind detection complexity of a terminal device, increasing processing burden of the terminal device, and affecting user experience.

SUMMARY

Embodiments of this application provide a control information sending method and apparatus, and a control information receiving method and apparatus, so that a quantity of bits in control information can remain fixed, thereby reducing blind detection complexity of a terminal device, reducing processing burden of the terminal device, and improving user experience.

According to a first aspect, a control information sending method is provided, where the method includes:

generating, by a network device, first control information for a first TB, where the first TB includes n code block CB groups, and $1 \leq n \leq N$, where N is a maximum quantity of CB groups included in the first TB, and $N \geq 1$; each CB group includes at least one CB; the first control information includes N control information fields, and the N control information fields are in a one-to-one correspondence with the maximum N CB groups included in the first TB; and a control information field i in the N control information fields is used to indicate whether a CB group corresponding to the control information field i is to be sent or received, and $i \in [1, N]$; and sending, by the network device, the first control information to a terminal device.

A maximum quantity N of CB groups included in each TB is preset and the network device generates, based on the quantity N, control information including N control information fields, so that sizes of control information for all TBs are the same, or resources occupied by control information for all TBs are the same. This can avoid a dynamic change in a quantity of bits in the control information, so as to reduce blind detection complexity of a terminal device, reduce processing burden of the terminal device, and improve user experience.

Optionally, the method further includes: sending, by the network device, first indication information to the terminal device by using higher layer signaling or physical layer signaling, where the first indication information is used to indicate a value of N.

The network device indicates the value of N to the terminal device, so that the network device itself can adjust the value of N. In this way, different terminal devices can be corresponding to different values of N, and further, lengths of control information received by different terminal devices are different, so that different requirements of different terminal devices on lengths of control information can be flexibly satisfied, thereby further improving practicability of this embodiment of this application.

Optionally, the value of N is predefined.

The value of N is specified by a communications system or a communication protocol, so as to reduce interactions between the network device and the terminal device, and reduce signaling overheads.

Optionally, the method further includes: determining, by the network device, a value of n based on a quantity A of bits in the first TB, a maximum quantity Z of bits included in each CB, and a maximum quantity X of CBs included in each CB, where A is an integer greater than 0, Z is an integer greater than 0, and X is an integer greater than 0.

Optionally, the determining, by the network device, a value of n based on a quantity A of bits in the first TB, a maximum quantity Z of bits included in each CB, and a maximum quantity X of CBs included in each CB group includes: determining, by the network device when the first TB is configured to add check bits and $B \leq X \times Z$, that n=1, where B=A+T, T is a quantity of check bits added to the first transport block TB, and T>0; and L is a quantity of check bits added to each CB group, and $L \geq 0$.

Optionally, the determining, by the network device, a value of n based on a quantity A of bits in the first TB, a maximum quantity Z of bits included in each CB, and a maximum quantity X of CBs included in each CB group includes: determining, by the network device when the first TB is not configured to add check bits, that $n=\lceil A/(X\times Z-L)\rceil$, where L is a quantity of check bits added to each CB group, and $L\geq 0$.

Optionally, the determining, by the network device, a value of n based on a quantity A of bits in the first TB, a maximum quantity Z of bits included in each CB, and a maximum quantity X of CBs included in each CB group includes: determining, by the network device when the first TB is configured to add check bits and $B>X\times Z$, that $n=\lceil B/(X\times Z-L)\rceil$, where $B=A+T$, T is a quantity of check bits added to the first transport block TB, and $T>0$; and L is a quantity of check bits added to each CB group, and $L\geq 0$.

Optionally, the first TB is configured to add check bits.

Optionally, each CB in each CB group is configured to add check bits.

Optionally, the control information field i in the N control information fields is further used to indicate whether data corresponding to the CB group corresponding to the control information field i is initial transmission data or retransmission data.

The data corresponding to the CB group corresponding to the control information field i is data (for example, a bit obtained through coding) carried by the CB group corresponding to the control information field i.

The control information field i is used to indicate whether the data corresponding to the CB group corresponding to the control information field i is initial transmission data or retransmission data. This can implement flexible configuration of whether data carried by each CB group is initial transmission data or retransmission data, and can implement that a same TB can be used to transmit both initial transmission data and retransmission data, thereby improving flexibility of data transmission.

Optionally, the control information field i in the N control information fields is further used to indicate a redundancy version RV of data corresponding to the CB group corresponding to the control information field i.

The control information field i is used to indicate an RV of the data corresponding to the CB group corresponding to the control information field i. This can implement flexible configuration of an RV version of data carried by each CB group, and can implement that a same TB can be used to transmit data of different RV versions, thereby improving flexibility of data transmission.

Optionally, the first control information further includes a first field, and the first field is used to indicate whether data corresponding to all CB groups in the first TB is initial transmission data or retransmission data, and/or the first control information further includes a second field, and the second field is used to indicate a redundancy version RV of data corresponding to all CB groups in the first TB.

According to a second aspect, a control information receiving method is provided, where the method includes: receiving, by a terminal device, first control information that is for a first TB and that is sent by a network device, where the first TB includes n code block CB groups, and $1\leq n\leq N$, where N is a maximum quantity of CB groups included in the first TB, and $N\geq 1$; each CB group includes at least one CB; the first control information includes N control information fields, and the N control information fields are in a one-to-one correspondence with the maximum N CB groups included in the first TB; and a control information field i in the N control information fields is used to indicate whether a CB group corresponding to the control information field i is to be sent or received, and $i\in[1, N]$; and determining, by the terminal device based on the control information field i in the N control information fields, whether the CB group corresponding to the control information field i is to be sent or received.

Optionally, the method further includes: receiving, by the terminal device, first indication information sent by the network device by using higher layer signaling or physical layer signaling, where the first indication information is used to indicate a value of N.

Optionally, the value of N is predefined.

Optionally, the method further includes: determining, by the terminal device, a value of n based on a quantity A of bits in the first TB, a maximum quantity Z of bits included in each CB, and a maximum quantity X of CBs included in each CB.

Optionally, the determining, by the terminal device, a value of n based on a quantity A of bits in the first TB, a maximum quantity Z of bits included in each CB, and a maximum quantity X of CBs included in each CB group includes: determining, by the terminal device when the first TB is configured to add check bits and $B\leq X\times Z$, that $n=1$; or determining, by the terminal device when the first TB is not configured to add check bits, that $n=\lceil A/(X\times Z-L)\rceil$; or determining, by the terminal device when the first TB is configured to add check bits and $B>X\times Z$, that $n=\lceil B/(X\times Z-L)\rceil$, where $B=A+T$, T is a quantity of check bits added to the first transport block TB, and $T>0$; and L is a quantity of check bits added to each CB group, and $L\geq 0$.

Optionally, the first TB is configured to add check bits.

Optionally, each CB in each CB group is configured to add check bits.

Optionally, the control information field i in the N control information fields is further used to indicate whether data corresponding to the CB group corresponding to the control information field i is initial transmission data or retransmission data.

Optionally, the control information field i in the N control information fields is further used to indicate a redundancy version RV of data corresponding to the CB group corresponding to the control information field i.

Optionally, the first control information further includes a first field, and the first field is used to indicate whether data corresponding to all CB groups in the first TB is initial transmission data or retransmission data, and/or the first control information further includes a second field, and the second field is used to indicate a redundancy version RV of data corresponding to all CB groups in the first TB.

According to a third aspect, a control information sending apparatus is provided, and is configured to execute the method according to the first aspect and any possible implementation of the first aspect. Specifically, the control information sending apparatus may include units configured to execute the method according to the first aspect and any possible implementation of the first aspect.

According to a fourth aspect, a control information receiving apparatus is provided, and is configured to execute the method according to the second aspect and any possible implementation of the second aspect. Specifically, the control information receiving apparatus may include units configured to execute the method according to the second aspect and any possible implementation of the second aspect.

According to a fifth aspect, a control information sending device is provided, including a memory and a processor, where the memory is configured to store a computer program, and the processor is configured to invoke the computer program from the memory and run the computer program, so that the control information sending device executes the method in the first aspect and any possible implementation of the first aspect.

According to a sixth aspect, a control information receiving device is provided, including a memory and a processor, where the memory is configured to store a computer program, and the processor is configured to invoke the computer program from the memory and run the computer program, so that the control information receiving device executes the method in the second aspect and any possible implementation of the second aspect.

According to a seventh aspect, a computer program product is provided, where the computer program product includes computer program code. When the computer program code is executed by a communications unit and a processing unit, or a transceiver and a processor of a network device, the network device is caused to execute the method in the first aspect or any possible implementation of the first aspect.

According to an eighth aspect, a computer program product is provided, where the computer program product includes computer program code. When the computer program code is executed by a communications unit and a processing unit, or a transceiver and a processor of a terminal device, the terminal device is caused to execute the method in the second aspect or any possible implementation of the second aspect.

According to a ninth aspect, a computer readable storage medium is provided. The computer readable storage medium stores a program and the program causes a network device to execute the method according to the first aspect or any possible implementation of the first aspect.

According to a tenth aspect, a computer readable storage medium is provided. The computer readable storage medium stores a program, and the program causes a terminal device to execute the method according to the second aspect or any possible implementation of the second aspect.

With reference to the foregoing aspects and various implementations of the foregoing aspects, in another implementation, the value of N is any one of 1, 2, 4, 8, or the like.

With reference to the foregoing aspects and various implementations of the foregoing aspects, in another implementation, each CB group in the first TB is configured to add a check bit.

With reference to the foregoing aspects and various implementations of the foregoing aspects, in another implementation, each control information field includes at least one bit.

With reference to the foregoing aspects and various implementations of the foregoing aspects, in another implementation, the N control information fields included in the first control information are a bitmap.

DETAILED DESCRIPTION OF ILLUSTRATIVE EMBODIMENTS

The following describes technical solutions of this application with reference to accompanying drawings.

Terms such as "component", "module", and "system" used in this specification are used to indicate computer-related entities, hardware, firmware, combinations of hardware and software, software, or software being executed. For example, a component may be, but is not limited to, a process running on a processor, a processor, an object, an executable file, an execution thread, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed from various computer readable media that store various data structures. For example, the components may communicate by using a local and/or remote process and according to, for example, a signal having one or more data packets (for example, data from one component interacting with another component in a local system, a distributed system, and/or across a network such as the Internet interacting with other systems by using the signal).

It should be understood that the embodiments of this application may be applied to various communications systems such as a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, a Long Term Evolution Advanced (LTE-A) system, a Universal Mobile Telecommunications System (UMTS), and a next-generation communications system.

Generally, a quantity of connections supported by a conventional communications system is limited and the conventional communications is easy to implement. However, with development of communications technologies, a mobile communications system not only supports conventional communication, but also supports, for example, device-to-device (D2D) communication, machine-to-machine (M2M) communication, machine type communication (Machine Type Communication, MTC), and vehicle to vehicle (V2V) communication.

Embodiments of this application describe the embodiments with reference to a terminal device. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a wireless local area network (WLAN), a cellular phone, a cordless phone, a Session Initiation Protocol (SIP) phone, a wireless local loop (WLL) station, a personal digital assistant (PDA) device, a handheld device having a wireless communication function, a computing device, another processing device connected to a wireless modem, an in-vehicle device, a wearable device, a terminal device in a next-generation communications system, for example, a fifth-generation (5G) network, a terminal device in a future evolved public land mobile network (PLMN) network, or the like.

As an example rather than a limitation, in the embodiments of this application, the terminal device may alternatively be a wearable device. A wearable device may also be referred to as a wearable smart device, and is a generic name for devices that are wearable and that are developed by performing intelligent design for daily wear by using a wearable technology, such as glasses, gloves, a watch, clothing, or shoes. A wearable device is a portable device that is directly worn on a human body or integrated with clothes or an accessory of a user. The wearable device is not merely a hardware device, and implements powerful functions through software support, data exchange, and cloud-based interaction. In a broad sense, wearable smart devices include the wearable smart devices that have a full range of functions and a large size and that do not rely on smartphones to implement all or some functions, for example, smart watches and smart glasses; and wearable smart devices that focus on only one type of application function and that need to be used in cooperation with other devices such as smartphones, for example, various smart bands and smart jewelry for body signs monitoring.

In addition, the embodiments of this application describe the embodiments with reference to a network device. The network device may be a device, such as a network device, that is configured to communicate with a mobile device. The network device may be an access point (AP) in a WLAN, a base transceiver station (BTS) in GSM or CDMA, a NodeB (NB) in WCDMA, an evolved Node B (eNB or eNodeB) in LTE, a relay node or an access point, an in-vehicle device, a wearable device, a network device in a future 5G network, a network device in a future evolved PLMN network, or the like.

In addition, in the embodiments of this application, the network device provides a service for a cell, and the terminal device communicates with the network device by using a transmission resource (for example, a frequency-domain resource, or a spectrum resource) used by the cell. The cell may be a cell corresponding to the network device (for example, a base station), and the cell may belong to a macro base station, or may belong to a base station corresponding to a small cell. The small cell herein may include a metro cell, a micro cell, a pico cell, a femto cell, and the like. These small cells have advantages such as a small coverage area and low transmit power, and are applicable to a high-speed data transmission service.

In addition, a plurality of cells may operate at a same frequency on a carrier in an LTE system. In some special scenarios, it can be considered that concepts of the carrier and the cell in the LTE system are equivalent. For example, in a carrier aggregation (CA) scenario, when a supplementary carrier is configured for UE, both a carrier index of the supplementary carrier and a cell identity (Cell ID) of a secondary cell working on the supplementary carrier are carried. In this case, it can be considered that concepts of the carrier and the cell are equivalent. For example, that the UE accesses a carrier is equivalent to that the UE accesses a cell.

A method and an apparatus provided in the embodiments of this application may be applied to a terminal device or a network device. The terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more types of computer operating systems that implement service processing by using a process, such as a Linux operating system, a Unix operating system, an Android operating system, an iOS operating system, or a Windows operating system. The application layer includes applications such as a browser, an address book, word processing software, or instant messaging software. In addition, in the embodiments of this application, a specific structure of an execution body of a signal transmission method is not particularly limited in the embodiments of this application, provided that communication can be implemented based on the signal transmission method in the embodiments of this application by running a program that records code for the signal transmission method in the embodiments of this application. For example, the execution body of a wireless communication method in the embodiments of this application may be a terminal device or a network device, or a function module that is in the terminal device or the network device and that can invoke a program and execute the program.

In addition, aspects or features in the embodiments of this application may be implemented as a method, an apparatus or a product that uses standard programming and/or engineering technologies. The term "product" used in this application covers a computer program that can be accessed from any computer readable component, carrier, or medium. For example, the computer readable medium may include, but is not limited to, a magnetic storage component (for example, a hard disk, a floppy disk, or a magnetic tape), an optical disc (for example, a compact disc (CD), a digital versatile disc (DVD), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include, but is not limited to, a radio channel, and various other media that can store, contain, and/or carry an instruction and/or data.

Figure 1:
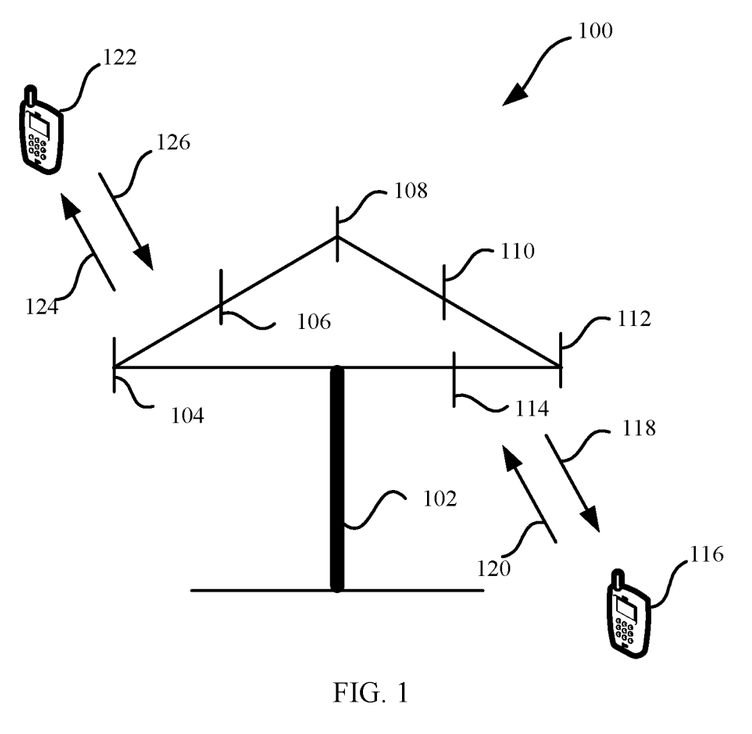
FIG. 1 is a schematic architectural diagram of a communications system applicable to a control information sending method and an apparatus, and a control information receiving method and an apparatus according to an embodiment of this application.

FIG. 1 is a schematic diagram of a wireless communications system according to an embodiment of this application. As shown in FIG. 1, the communications system 100 includes a network device 102. The network device 102 may include one or more antennas, such as antennas 104, 106, 108, 110, 112, and 114. In addition, the network device 102 may additionally include a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna, etc.) related to signal transmission and reception.

The network device 102 may communicate with a plurality of terminal devices (for example, a terminal device 116 and a terminal device 122). However, it can be understood that the network device 102 may communicate with any quantity of terminal devices similar to the terminal device 116 or the terminal device 122. The terminal devices 116 and 122 each may be, for example, a cellular phone, a smartphone, a portable computer, a handheld communications device, a handheld computing device, a satellite radio apparatus, a global positioning system, a PDA, and/or another appropriate device used for communication in the wireless communications system 100.

As shown in FIG. 1, the terminal device 116 communicates with the antennas 112 and 114. The antennas 112 and 114 send information to the terminal device 116 through a forward link (also referred to as a downlink) 118, and receive information from the terminal device 116 through a reverse link (also referred to as an uplink) 120. In addition, the terminal device 122 communicates with the antennas 104 and 106. The antennas 104 and 106 send information to the terminal device 122 through a forward link 124, and receive information from the terminal device 122 through a reverse link 126.

For example, in a frequency division duplex (FDD) system, different frequency bands may be used on the forward link 118 and the reverse link 120, and different frequency bands may be used on the forward link 124 and the reverse link 126.

For another example, in a time division duplex (TDD) system and a full duplex system, a same frequency band may be used on the forward link 118 and the reverse link 120, and a same frequency band may be used on the forward link 124 and the reverse link 126.

Each antenna (or an antenna group including a plurality of antennas) and/or an area designed for communication are/is referred to as a sector of the network device 102. For example, an antenna group may be designed to communicate with a terminal device in a sector of a coverage area of the network device 102. A network device may send, by using a single antenna or multi-antenna transmit diversity, a signal to all terminal devices in a sector corresponding to the network device. In a process in which the network device 102 communicates with the terminal devices 116 and 122 through the forward links 118 and 124 respectively, a transmit antenna of the network device 102 may improve signal-to-noise ratios of the forward links 118 and 124 through beamforming. In addition, compared with a manner in which a network device sends a signal to all terminal devices of the network device by using a single antenna or multi-antenna transmit diversity, when the network device 102 sends a signal to the randomly dispersed terminal devices 116 and 122 in a related coverage area through beamforming, a mobile device in a neighboring cell receives less interference.

Within a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a specific quantity of data bits to be sent to the wireless communications receiving apparatus through a channel. The data bits may be included in a data transport block (or a plurality of transport blocks), and the transport block may be segmented to generate a plurality of code blocks.

In addition, the communications system 100 may be a PLMN network, a D2D network, an M2M network, or another network. FIG. 1 is merely a simplified schematic diagram used as an example. The network may further include another network device, which is not graphed in FIG. 1.

In this embodiment of this application, the network device may perform control information transmission with a plurality of terminal devices, and processes of control information transmission between the network device and the terminal devices are similar. For ease of understanding, the following provides description by using a control information transmission process between the network device and a terminal device #A as an example.

In addition, in this embodiment of this application, a plurality of pieces of control information for a plurality of TBs may be transmitted between the network device and the terminal device #A. Generation and transmission processes of control information for all the TBs are similar. For ease of understanding, the following provides description by using a process of transmission of control information (marked as control information #A below for ease of understanding and description) for a TB #A between the network device and the terminal device #A as an example.

Figure 2:
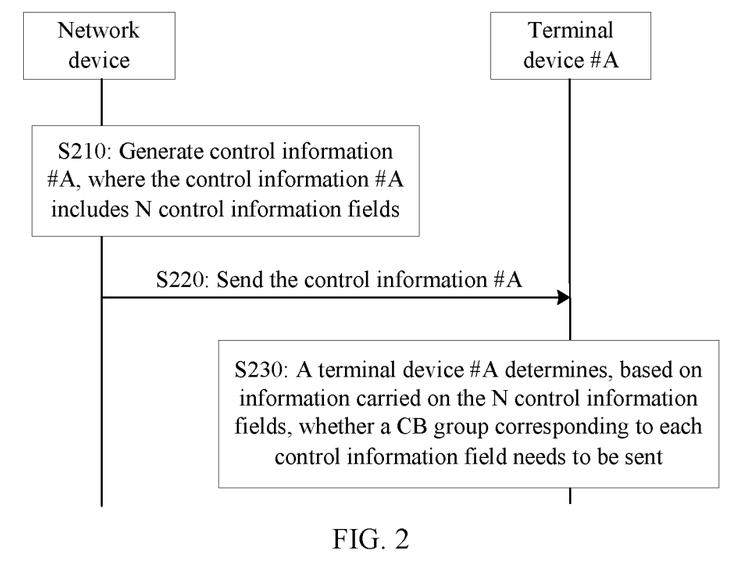
FIG. 2 is a schematic interaction diagram of a control information transmission process according to an embodiment of this application.

FIG. 2 is a schematic interaction diagram of a method 200 for performing transmission of control information #A for a TB #A between a network device and a terminal device #A.

As shown in FIG. 2, in S210, when the network device determines to perform transmission (for example, uplink transmission or downlink transmission) of the TB #A (that is, an example of a first TB) with the terminal device #A, the network device may generate control information #A (that is, an example of first control information) for the TB #A.

In this embodiment of this application, the control information #A includes N control information fields.

The following describes a manner of determining a value of "N".

In this embodiment of this application, each TB (including the TB #A) transmitted in a communications system can be divided into a plurality of (at least one) CB groups, and each CB group includes at least one CB.

In this embodiment of this application, the value of N is a maximum quantity of CB groups that a TB can be divided into.

Specifically, in this embodiment of this application, for a terminal device (for example, the terminal device #A), a maximum quantity (that is, N) of CB groups that each TB can be divided into is definite. For example, the TB #A that is to be sent or received by the terminal device #A can be divided into a maximum of N CB groups. For ease of understanding and distinguishing, the maximum of N CB groups that the TB #A can be divided into is referred to as "N theoretical CB groups" below.

In this embodiment of this application, the value of N may be determined by the network device.

For example, the network device may determine the value of N based on information such as a transmission capability and a processing capability of the terminal device, and a service type or a delay requirement of a service to which the TB #A belongs.

For another example, the terminal device may alternatively determine an expected value of N based on the foregoing information such as the transmission capability and the processing capability of the terminal device, and the service type or the delay requirement of the service to which the TB #A belongs, and the terminal device may send the expected value of N to the network device; and the network device may determine the value of N based on the expected value of N.

Thereafter, the network device may send the value of N to the terminal device. For example, the network device may send indication information (that is, an example of first indication information) of the value of N to the terminal device by using, for example, Radio Resource Control (Radio Resource Control, RRC) signaling (that is, an example of higher layer signaling) or physical layer signaling.

In this case, for different terminal devices, values of N may be different. In other words, the network device may determine different values of N for different terminal devices.

Alternatively, in this embodiment of this application, the value of N may be specified by the communications system or a communications protocol.

In this case, all values of N used by all terminal devices in the communications system may be the same.

In addition, the value of N may be stored in the network device, and the network device may send, by using a broadcast message or the like, the indication information of the value of N to all terminal devices, including the terminal device #A, in the communications system.

Alternatively, the value of N may be preconfigured in the terminal device #A by a manufacturer, a telecommunication operator, or a user.

Therefore, the network device and the terminal device #A can determine the value of N.

It should be noted that the foregoing methods and processes of determining the value of N are merely examples for description. This application is not limited thereto. All other methods and processes of determining the value of N by the network device and the terminal device fall within the protection scope of this application, provided that values of N that are determined by the network device and the terminal device are the same.

Return to S210. As described above, the control information #A includes N control information fields, and the N control information fields may be in a one-to-one correspondence with the N theoretical CB groups (that is, a maximum of N CB groups included in the TB #A).

In addition, a control information field i in the N control information fields may be used to indicate whether a theoretical CB group corresponding to the control information field i is to be sent by the network device and received by the terminal device.

Alternatively, the control information field i in the N control information fields may be used to indicate whether the theoretical CB group corresponding to the control information field i is to be received by the network device and sent by the terminal device.

Herein, $i \in [1, N]$.

It should be understood that the value range of i is merely an example for description. This application is not limited thereto. For example, the value range of i may alternatively be $i \in [0, N-1]$.

Specifically, in this embodiment of this application, the network device and the terminal device may actually divide a TB (for example, the TB #A) that is to be received or sent into n CB groups (marked as "n actual CB groups" below for ease of understanding and description), where $1 \leq n \leq N$.

In addition, in this embodiment of this application, the TB #A may be divided in any manner. This is not particularly limited in this application, provided that n actual CB groups can be determined.

As an example rather than a limitation, in this embodiment of this application, the network device and the terminal device may determine the value of n based on a quantity A of bits in the first TB, a maximum quantity Z of bits included in each CB, and a maximum quantity X of CBs included in each CB.

For example, if the first TB is configured to add check bits and $B \leq X \times Z$, the terminal device determines that n=1.

For another example, if the first TB is not configured to add check bits, the terminal device determines that $n = \lceil A/(X \times Z - L) \rceil$.

For still another example, if the first TB is configured to add check bits and $B > X \times Z$, the terminal device determines that $n = \lceil B/(X \times Z - L) \rceil$.

B=A+T, T is a quantity of check bits added to the first transport block TB, and T>0. L is a quantity of check bits added to each CB group, and $L \geq 0$.

It should be understood that the above-enumerated methods of dividing the TB #A into n CB groups by the network device and the terminal device are merely examples for description, and are not specifically limited in this application. The network device and the terminal device may divide the TB #A in any manner.

That is, in this embodiment of this application, n control information fields (marked as "n control information fields #1" below for ease of understanding and description) in the N control information fields indicate that corresponding CB groups (that is, n actual CB groups) need to be sent (by the network device or the terminal device). In addition, N-n control information fields (marked as "N-n control information fields #2" below for ease of understanding and description) in the N control information fields indicate that corresponding CB groups (that is, CB groups that are in the N theoretical CB groups and that are different from the n actual CB groups) do not need to be sent (by the network device or the terminal device). In other words, the N-n control information fields #2 indicate that the corresponding CB groups do not exist or are CB groups that are not divided.

Therefore, the network device can determine the N control information fields (to be specific, information carried in the N control information fields) in the control information #A.

It should be noted that in this embodiment of this application, a location, in the N control information fields, of a control information field corresponding to each of the n actual CB groups may be randomly determined by the network device. This is not particularly limited in this application.

For example, the n control information fields corresponding to the n actual CB groups may be continuously arranged in the N control information fields.

Alternatively, the n control information fields corresponding to the n actual CB groups may be arranged at intervals in the N control information fields. In other words, there may be a control information field or control information fields corresponding to one or more CB groups that do not need to be sent (by the network device or the terminal device) between control information fields corresponding to two actual CB groups that are adjacent in an arrangement sequence.

As described above, in this embodiment of this application, the n control information fields (that is, control information fields corresponding to the n actual CB groups) in the N control information fields indicate that the corresponding CB groups need to be sent (by the network device or the terminal device).

In this embodiment of this application, as an example rather than a limitation, each control information field may include one bit.

As an example rather than a limitation, information carried in the n control information fields (that is, the control information fields #1) may be 1, and information carried in a control information field (that is, the control information field #2) in the N control information fields that is different from the n control information fields may be 0.

Therefore, (for example, in subsequent S230) after receiving the control information #A, the terminal device #A may determine, based on information carried in each control information field, whether a CB group corresponding to the control information field is to be sent (by the network device or the terminal device #A).

For example, if information carried in a control information field (marked as a control information field #α for ease of understanding and description) is 1, the terminal device #A may determine that a CB group corresponding to the control information field #α is to be sent (by the network device or the terminal device #A).

For another example, if information carried in a control information field (marked as a control information field #α for ease of understanding and description) is 0, the terminal device #A may determine that a CB group corresponding to the control information field #α does not need to be sent (by the network device or the terminal device #A).

It should be noted that the above-enumerated specific values of information carried in the control information fields are merely examples for description. This application is not limited thereto. All other values (or bit sequences) that can be used by the terminal device to distinguish between a CB group that is to be sent and a CB group that does not need to be sent fall within the protection scope of this application.

As an example rather than a limitation, in this embodiment of this application, in addition to being used to indicate whether the CB group corresponding to the control information field i is to be sent, the control information field i may further indicate whether the CB group corresponding to the control information field i is initial transmission data (or new transmission data) or retransmission data.

As an example rather than a limitation, in this case, the control information field i may include two or more bits. In the following, Table 1 lists information that can be carried in the control information field i and a meaning indicated by the information.

TABLE 1

| Coded bit carried in a control information field i | Content indicated by the control information field i |
| --- | --- |
| 00 | A CB group corresponding to the control information field i does not need to be sent or received. |
| 01 | A CB group corresponding to the control information field i is to be sent or received, and the CB group corresponding to the control information field i is retransmitted data. |
| 10 | A CB group corresponding to the control information field i is to be sent or received, and the CB group corresponding to the control information field i is initial transmission data. |

It should be understood that the above-enumerated specific values of information carried in the control information fields are merely examples for description. This embodiment of this application is not limited thereto. All other values (or bit sequences) that can be used by the terminal device to distinguish between a CB group that is to be sent and a CB group that does not need to be sent, and that can be used by the terminal device to distinguish whether a CB group is initial transmission data or retransmission data fall within the protection scope of this application.

As an example rather than a limitation, in this embodiment of this application, in addition to being used to indicate whether the CB group corresponding to the control information field i is to be sent, the control information field i may further indicate a redundancy version (RV) of the CB group corresponding to the control information field i.

As an example rather than a limitation, in this case, the control information field i may include two or more bits. In the following, Table 2 lists information that can be carried in the control information field i and a meaning indicated by the information.

TABLE 2

| Coded bit carried in a control information field i | Content indicated by the control information field i |
| --- | --- |
| 00 | A CB group corresponding to the control information field i does not need to be sent or received. |
| 01 | A CB group corresponding to the control information field i is to be sent or received, and a redundancy version of the CB group corresponding to the control information field i is 0. |
| 10 | A CB group corresponding to the control information field i is to be sent or received, and a redundancy version of the CB group corresponding to the control information field i is 1. |
| 11 | A CB group corresponding to the control information field i is to be sent or received, and a redundancy version of the CB group corresponding to the control information field i is 2. |

It should be noted that the above-enumerated specific values of information carried in the control information fields are merely examples for description. This embodiment of this application is not limited thereto. All other values (or bit sequences) that can be used by the terminal device to distinguish between a CB group that is to be sent and a CB group that does not need to be sent, and that can be used by the terminal device to distinguish a redundancy version of a CB group fall within the protection scope of this application.

Figure 3:
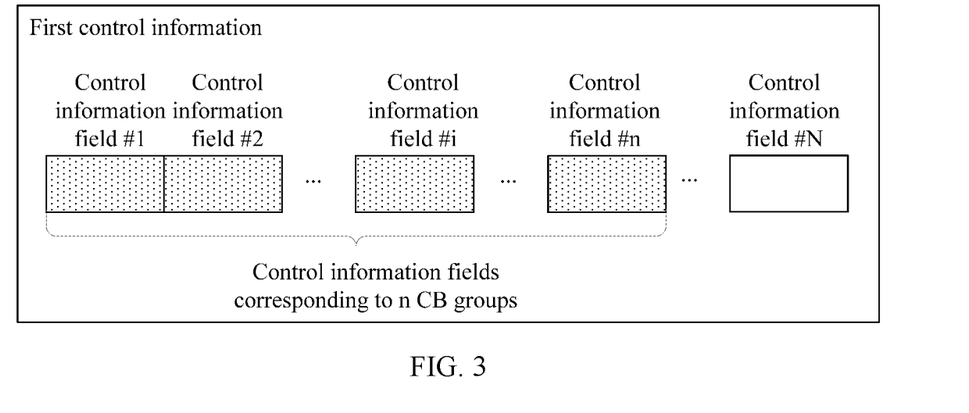
FIG. 3 is a schematic diagram of an example of control information according to an embodiment of this application.

FIG. 3 shows an example of a format of control information #A. As shown in FIG. 3, the control information #A may include N control information fields.

It should be noted that although FIG. 3 does not show specific information of information carried in each control information field in the N control information fields, it can be learned based on the foregoing descriptions that n control information fields (that is, control information fields corresponding to n actual CB groups) in the N control information fields indicate that corresponding CB groups need to be sent (by a network device or a terminal device), and N-n control information fields in the N control information fields indicate that corresponding CB groups do not need to be sent (by the network device or the terminal device), or in other words, the N-n control information fields in the N control information fields indicate that corresponding CB groups do not exist. To avoid repetition, description of same or similar cases is omitted below.

It should be understood that the above-enumerated format of the control information #A is merely an example for description. This application is not limited thereto. The control information #A may further include a field used to carry other information.

Figure 4:
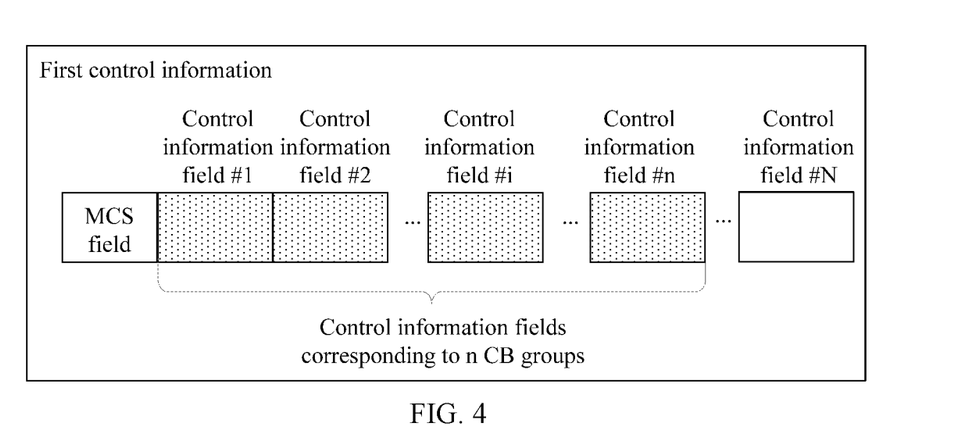
FIG. 4 is a schematic diagram of another example of control information according to an embodiment of this application.

For example, FIG. 4 shows another example of a format of control information #A. As shown in FIG. 4, in addition to N control information fields, the control information #A may further include an MCS field used to carry MCS information, where the MCS information may be used to indicate a modulation and coding scheme of a TB #A (specifically, CBs included in the TB #A).

In addition, in the format of the control information #A shown in FIG. 3 or FIG. 4, each control information field may be further used to indicate whether a corresponding CB group is retransmission data or initial transmission data.

Alternatively, in the format of the control information #A shown in FIG. 3 or FIG. 4, each control information field may be further used to indicate an RV version of a corresponding CB group.

Figure 5:
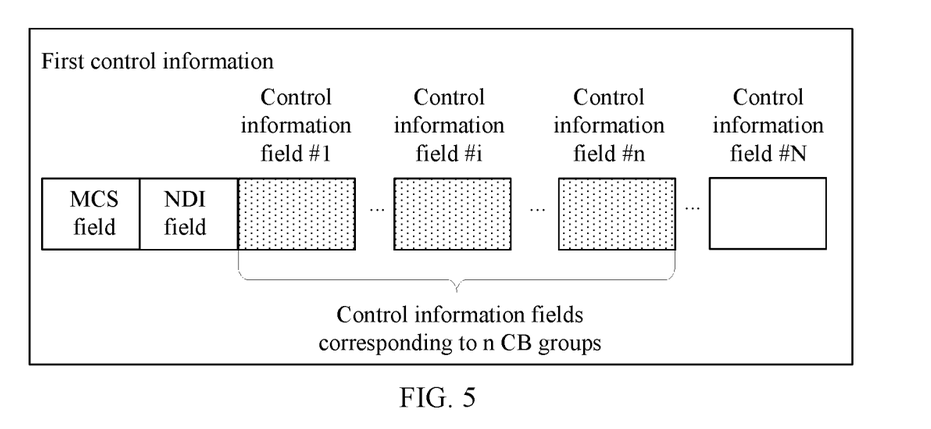
FIG. 5 is a schematic diagram of still another example of control information according to an embodiment of this application.

For another example, FIG. 5 shows still another example of a format of control information #A. As shown in FIG. 5, in addition to N control information fields, the control information #A may further include an MCS field used to carry MCS information, and an NDI field used to indicate whether data carried in a TB #A is initial transmission data or retransmission data.

As an example rather than a limitation, for example, when N=4, the N control information fields may include a total of four bits.

For example, when '0' indicates that a current CB group is not sent, and '1' indicates that the current CB group is sent, if the N control information fields are '1100', when the NDI indicates that data in the TB #A is newly transmitted data, the N control information fields indicate that the TB #A includes only a CB group 1 (that is, a CB group corresponding to a first control information field in the N control information fields) and a CB group 2 (that is, a CB group corresponding to a second control information field in the N control information fields), but does not include a CB group 3 (that is, a CB group corresponding to a third control information field in the N control information fields) and a CB group 4 (that is, a CB group corresponding to a fourth control information field in the N control information fields).

In addition, in the format of the control information #A shown in FIG. 5, each control information field may be further used to indicate an RV version of a corresponding CB group.

Figure 6:
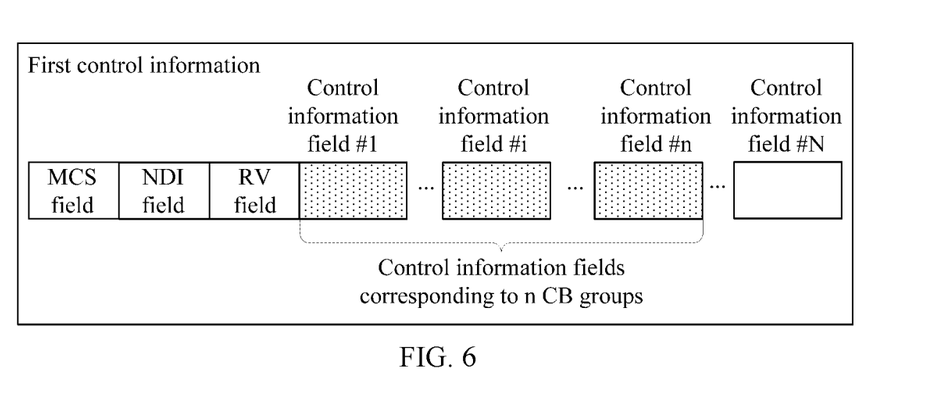
FIG. 6 is a schematic diagram of yet another example of control information according to an embodiment of this application.

For another example, FIG. 6 shows still another example of a format of control information #A. As shown in FIG. 6, in addition to N control information fields, the control information #A may further include an MCS field used to carry MCS information, an NDI field used to indicate whether data carried in a TB #A is initial transmission data or retransmission data, and an RV field used to carry an RV version of data carried in the TB #A.

After the control information #A is determined as described above, in S220, the network device may send the control information #A to the terminal device #A.

Therefore, in S230, after receiving the control information #A, the terminal device #A may determine, based on information carried in each control information field, whether a CB group corresponding to the control information field is to be sent (by the network device or the terminal device #A).

To be specific, the terminal device #A can determine, based on each control information field in the control information #A, whether each CB group in N CB groups (specifically, n theoretical CB groups) in the TB #A is to be sent or received; the terminal device #A can determine, based on each control information field in the control information #A, a quantity of CB groups in the TB #A that need to be sent or received; and the terminal device #A can determine, based on each control information field in the control information #A, which CB groups in the N CB groups (specifically, N theoretical CB groups) are CB groups that need to be actually sent (specifically, n actual CB groups).

In addition, in this embodiment of this application, the N control information fields may be in a form of a bitmap (or bit mapping). In other words, in this embodiment of this application, the N control information fields include N bits, and each bit is corresponding to one control information field. Moreover, the network device may determine, based on whether the CB group corresponding to the control information field i is to be sent or received, a bit (specifically, a bit value, for example, "1" or "0") on a bit corresponding to the control information field i.

In addition, in this embodiment of this application, a receiving device of data (for example, n CB groups) indicated by the control information #A may send feedback information (marked as feedback information #A below for ease of understanding and description) for the n CB groups to a sending device of the data indicated by the control information #A.

For example, the feedback information #A may include N feedback information fields, and the N feedback information fields may be in a one-to-one correspondence with the N theoretical CB groups (that is, a maximum of N CB groups included in the TB #A). In addition, a feedback information field i in the N feedback information fields may be used to indicate whether a theoretical CB group corresponding to the feedback information field i is transmitted successfully (or decoded successfully). Herein, i∈[1, N]. In addition, as an example rather than a limitation, in this embodiment of this application, each feedback information field may include one bit. In this case, the feedback information field #A may include N bits.

For another example, the feedback information #A may include n feedback information fields, and the n feedback information fields may be in a one-to-one correspondence with the n actual CB groups (that is, n CB groups actually included in the TB #A). In addition, a feedback information field j in the n feedback information fields may be used to indicate whether an actual CB group corresponding to the feedback information field j is transmitted successfully (or decoded successfully), where j∈[1, n]. In addition, as an example rather than a limitation, in this embodiment of this application, each feedback information field may include one bit. In this case, the feedback information field #A may include n bits.

In addition, in this embodiment of this application, the N feedback information fields (or n feedback information fields) may be in a form of a bitmap (or bit mapping). In other words, in this embodiment of this application, the N feedback information fields include N bits, and each bit is corresponding to one feedback information field. Moreover, a receiving device may determine, based on whether a CB group corresponding to the feedback information field i is decoded successfully, a bit (specifically, a bit value, for example, "1" or "0") on a bit corresponding to the feedback information field i.

The maximum quantity N of CB groups included in each TB is specified and the network device generates, based on the quantity N, the control information including N control information fields, so that sizes of control information for all TBs are the same, or resources occupied by control information for all TBs are the same. This can ensure that a quantity of bits included in the control information remains fixed, and therefore can avoid a dynamic change in a quantity of bits in the control information, so as to reduce blind detection complexity of the terminal device, reduce processing burden of the terminal device, and improve user experience.

Figure 7:
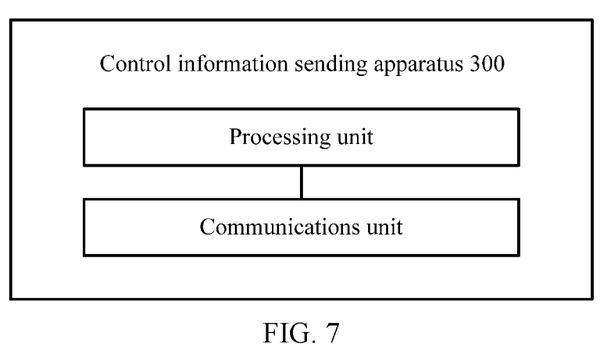
FIG. 7 is a schematic block diagram of an example of a control information sending apparatus according to an embodiment of this application.

FIG. 7 is a schematic block diagram of a control information sending apparatus 300 according to an embodiment of this application. The control information sending apparatus 300 may be corresponding to (for example, may be disposed on or is) the network device described in the method 200. In addition, modules or units of the control information sending apparatus 30o are configured to execute actions or processing processes executed by the network device described in the method 200. Herein, to avoid repetition, elaboration thereof is omitted.

In this embodiment of this application, the apparatus 300 may include a processor and a transceiver, and the processor and the transceiver are communicatively connected. Optionally, the apparatus 300 further includes a memory, and the memory and the processor are communicatively connected. Optionally, the processor, the memory, and the transceiver may be communicatively connected. The memory may be configured to store an instruction, and the processor is configured to execute the instruction stored in the memory, so as to control the transceiver to send information or a signal.

A processing unit in the apparatus 300 shown in FIG. 7 may be corresponding to the processor, and a communications unit in the apparatus 300 shown in FIG. 7 may be corresponding to the transceiver.

Figure 8:
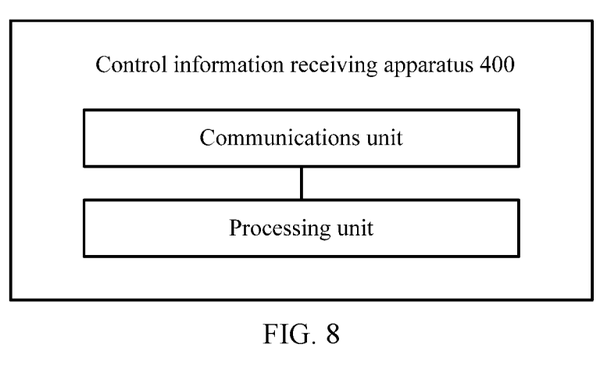
FIG. 8 is a schematic block diagram of another example of a control information sending apparatus according to an embodiment of this application.

FIG. 8 is a schematic block diagram of a control information receiving apparatus 400 according to an embodiment of this application. The control information receiving apparatus 400 may be corresponding to (for example, may be disposed on or is) the terminal device (for example, the terminal device #A) described in the method 200. In addition, modules or units of the control information receiving apparatus 400 are configured to execute actions or processing processes executed by the terminal device (for example, the terminal device #A) described in the method 200. Herein, to avoid repetition, elaboration thereof is omitted.

In this embodiment of this application, the apparatus 400 may include a processor and a transceiver, and the processor and the transceiver are communicatively connected. Optionally, the apparatus 400 further includes a memory, and the memory and the processor are communicatively connected. Optionally, the processor, the memory, and the transceiver may be communicatively connected. The memory may be configured to store an instruction, and the processor is configured to execute the instruction stored in the memory, so as to control the transceiver to receive information or a signal.

A processing unit in the apparatus 400 shown in FIG. 8 may be corresponding to the processor, and a communications unit in the apparatus 400 shown in FIG. 8 may be corresponding to the transceiver.

It should be noted that the foregoing method embodiments may be applied to a processor, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. It can implement or execute the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. The software modules may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory of the system and methods described in this specification includes but is not limited to these and any memory of another proper type.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that units and algorithm steps in examples described with reference to the embodiments disclosed in this specification can be implemented by electronic hardware or a combination of computer software and electronic hardware computer. Whether the functions are performed by hardware or software depends on particular applications and design constraints of the technical solutions. A person skilled in the art may use different methods to implement the described functions for each particular application, but it should not be considered that the implementation goes beyond the scope of the embodiments of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A control information receiving method, wherein the method comprises:
   receiving, by a terminal device, first control information for a first transport block (TB) from a network device, the first TB comprising n code block (CB) groups, where $1 \leq n \leq N$, where N is a maximum quantity of CB groups contained in the first TB, and $N \geq 1$; each CB group comprising at least one CB; the first control information comprising N control information fields, the N control information fields are in a one-to-one correspondence with the maximum quantity N CB groups contained in the first TB, first n control information fields in the N control information fields are in a one-to-one correspondence with the n CB groups contained in the first TB, and a control information field j in the n control information fields indicates whether a CB group corresponding to the control information field j is to be sent or received, and $j \in [1, n]$; and
   determining, by the terminal device based on a control information field i in the N control information fields, whether the CB group corresponding to the control information field i is to be sent or received.

2. The method according to claim 1, wherein the method further comprises:
   receiving, by the terminal device by using higher layer signaling or physical layer signaling, first indication information from the network device, wherein the first indication information indicates a value of N.

3. The method according to claim 1, wherein the N control information fields contained in the first control information are a bitmap of N bits.

4. The method according to claim 1, wherein the n control information fields are a bitmap of n bits.

5. The method according to claim 1, wherein the method further comprises:
   sending, by the terminal device, first feedback information to the network device, wherein the first feedback information comprises N feedback information fields, the N feedback information fields are in a one-to-one correspondence with the maximum N CB groups contained in the first TB, and a feedback information field i in the N feedback information fields indicates whether a CB group corresponding to the feedback information field i is decoded successfully, wherein $i \in [1, N]$.

6. The method according to claim 5, wherein the N feedback information fields are a bitmap of N bits.

7. An apparatus, comprising:
   one or more processors; and
   a computer-readable storage medium storing program instructions; wherein, when executed by the one or more processors, the instructions cause the apparatus to:
   receive first control information for a first TB from a network device, wherein the first TB comprises n code block (CB) groups, and $1 \leq n \leq N$, wherein N is a maximum quantity of CB groups contained in the first TB, and $N \geq 1$; wherein each CB group comprises at least one CB; wherein the first control information comprises N control information fields, wherein the N control information fields are in a one-to-one correspondence with the maximum quantity N CB groups contained in the first TB, wherein first n control information fields in the N control information fields are in a one-to-one correspondence with the n CB groups contained in the first TB, and wherein a control information field j in the n control information fields indicates whether a CB group corresponding to the control information field j is to be sent or received, and $j \in [1, n]$; and
   determine, based on a control information field i in the N control information fields, whether the CB group corresponding to the control information field i is to be sent or received.

8. The apparatus according to claim 7, wherein the instructions further cause the apparatus to:
   receive, by the apparatus by using higher layer signaling or physical layer signaling, first indication information from the network device, wherein the first indication information indicates a value of N.

9. The apparatus according to claim 7, wherein the N control information fields contained in the first control information are a bitmap of N bits.

10. The apparatus according to claim 7, wherein the n control information fields are a bitmap of n bits.

11. The apparatus according to claim 7, wherein the instructions further cause the apparatus to:
send first feedback information to the network device, wherein the first feedback information comprises N feedback information fields, the N feedback information fields are in a one-to-one correspondence with the maximum N CB groups contained in the first TB, and a feedback information field i in the N feedback information fields indicates whether a CB group corresponding to the feedback information field i is decoded successfully, wherein i∈[1, N].

12. The apparatus according to claim 11, wherein the N feedback information fields are a bitmap of N bits.

13. A non-transitory computer readable storage medium, comprising computer program code which when executed by a processor causes the processor to:
receive first control information for a first TB from a network device, wherein the first TB comprises n code block (CB) groups, and 1≤n≤N, wherein N is a maximum quantity of CB groups contained in the first TB, and N≥1; wherein each CB group comprises at least one CB; wherein the first control information comprises N control information fields, wherein the N control information fields are in a one-to-one correspondence with the maximum quantity N CB groups contained in the first TB, wherein first n control information fields in the N control information fields are in a one-to-one correspondence with the n CB groups contained in the first TB, and wherein a control information field j in the n control information fields indicates whether a CB group corresponding to the control information field j is to be sent or received, and j∈[1, n]; and
determine, based on a control information field i in the N control information fields, whether the CB group corresponding to the control information field i is to be sent or received.

14. The computer readable storage medium according to claim 13, wherein the program code further causes the processor to:
receive, by using higher layer signaling or physical layer signaling, first indication information from the network device, wherein the first indication information indicates a value of N.

15. The computer readable storage medium according to claim 13, wherein the N control information fields contained in the first control information are a bitmap of N bits.

16. The computer readable storage medium according to claim 13, wherein the n control information fields are a bitmap of n bits.

17. The computer readable storage medium according to claim 13, wherein the program code further causes the processor to:
send, first feedback information to the network device, wherein the first feedback information comprises N feedback information fields, the N feedback information fields are in a one-to-one correspondence with the maximum N CB groups contained in the first TB, and a feedback information field i in the N feedback information fields indicates whether a CB group corresponding to the feedback information field i is decoded successfully, wherein i∈[1, N], wherein the N feedback information fields are a bitmap of N bits.

* * * * *